Dec. 5, 1933.  W. MÖLLER  1,938,492
FLUID PRESSURE GOVERNING DEVICE FOR MEASURING SYSTEMS
Filed March 31, 1933
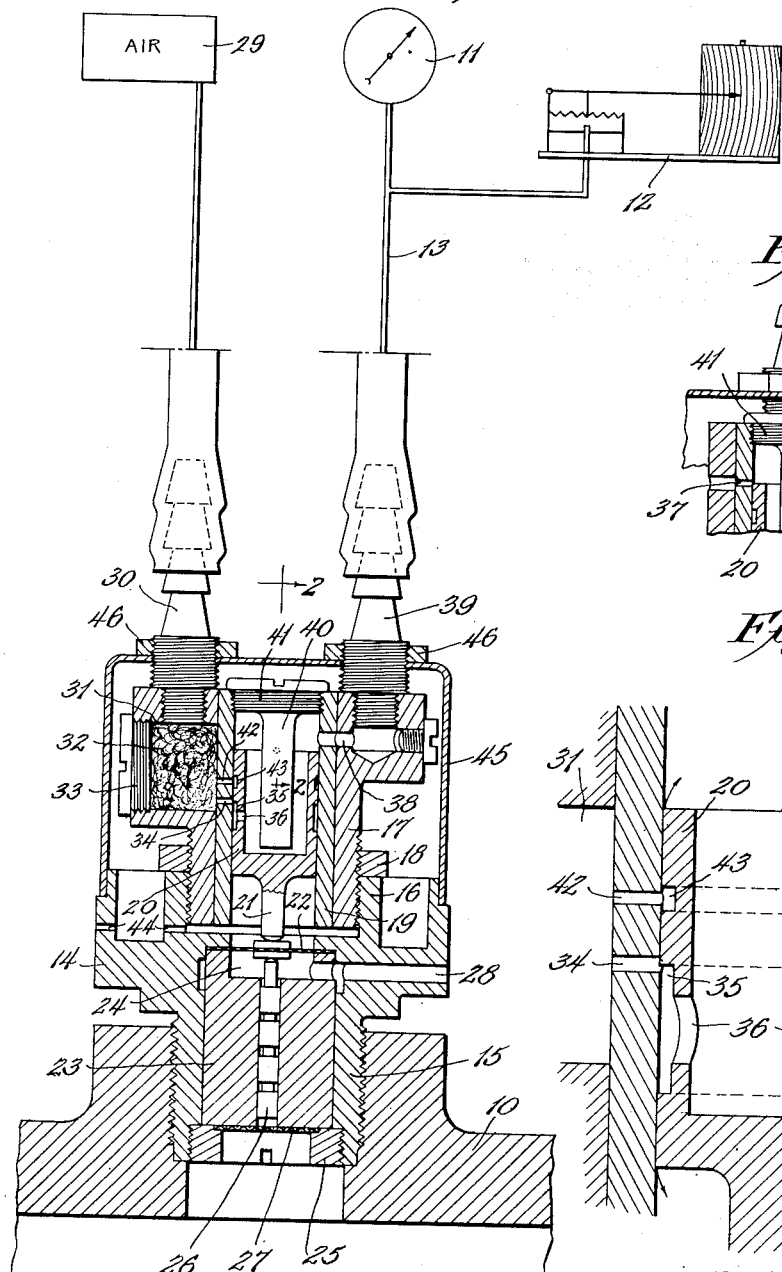
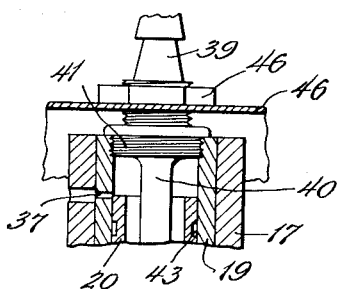
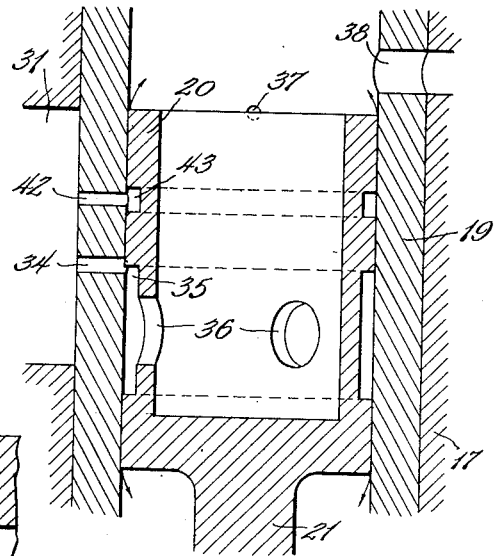
Inventor
Waldemar Moeller
A. D. Adams
Attorney Patented Dec. 5, 1933

1,938,492

UNITED STATES PATENT OFFICE 1,938,492

FLUID PRESSURE GOVERNING DEVICE FOR MEASURING SYSTEMS

Waldemar Möller, Berlin-Zehlendorf, Germany, assignor to Askania-Werke A. G. Vormals Central Werkstatt Dessau und Carl Bamberg-Friedenau, a German company Application March 31, 1933, Serial No. 663,821, and in Germany March 18, 1931

8 Claims. (Cl. 73—31)

This invention relates to measuring systems for accurately determining the magnitude of forces by means of fluid pressure gages and, among other objects, aims to provide a novel, relatively simple, very sensitive and dependable pressure governing device which is designed to employ an external source of fluid pressure and modify it according to the magnitude of the force to be measured. Another aim of the invention is to provide a fluid pressure governor having a piston-type valve which operates in a cylinder without oil and practically without friction.

Other aims and advantages of the invention will appear in the specification, when considered in connection with the accompanying drawing, wherein:

Fig. 1 is a central sectional view showing one form of the improved governor applied to a system for measuring or indicating the pressure of liquids;

Fig. 2 is a fragmentary sectional view taken on the line 2—2 of Fig. 1; and

Fig. 3 is an enlarged fragmentary sectional view showing the piston valve and cylinder.

The known distant-reading indicator systems which employ piston valve governors are subject to some drawbacks. In nearly all cases, the piston has a tendency to stick in the cylinder on account of friction, unevenly distributed pressure and other causes, thereby affecting the accuracy of the system. Moreover, such pistons have been lubricated to reduce friction and the oil affects the accuracy of the readings by introducing a varying amount of friction depending upon temperature, oil viscosity, film thickness, oil cleanliness and other factors. This invention provides a novel piston-type governor which operates practically without friction, having provision for producing an evenly distributed air cushion around the piston without any oil. Furthermore, the device is made very sensitive to changes in pressure or the magnitude of a force which is to be measured.

Referring particularly to the drawing, the illustrated embodiment of the invention is shown as being used to measure the pressure in an oil pressure system, for example, in an aeroplane motor lubricating system. However, the apparatus is by no means limited to such use. In this instance, we shall assume that a pipe 10 represents a part of the lubrication system of an aeroplane engine and one or more pressure gages 11 as well as a recorder 12 are connected in parallel to a pipe or rubber tube 13 which transmit governed air pressure from the novel governor. The pressure gage will ordinarily be mounted in the instrument panel and the recorder in some other convenient place to keep a pressure record if it is desired. These instruments may be of a conventional design if they are sufficiently accurate.

In Fig. 1, the governor is shown as comprising a body 14 having a tubular threaded extension or nipple 15 adapted to be screwed into the pipe 10. This body has an upstanding annular flange 16 which is internally screw threaded to receive a cylindrical housing 17 which can be adjusted therein and held in its adjusted position by a jamb nut 18. Within the housing 17 is frictionally fitted the valve cylinder 19 which is preferably made of Monel metal having a very highly polished inner surface. A highly polished, cup-shaped governing piston 20, also preferably made of the metal is mounted in the cylinder and has an integral stem 21 which projects through the lower end of the cylinder.

In this example, the piston stem 21 rests on the reinforced center of a flexible diaphragm 22 which is clamped in the bore of the fitting by a cylindrical plug 23 having a counterbore 24 at its upper end to provide clearance for the diaphragm. This cylindrical plug is here held in the fitting by an annular lock nut 25. A grooved piston stem 26 projects into the cylindrical plug and is confined therein by a screen 27. The upper end of this piston stem acts on the reinforced center of the bottom of the diaphragm 22 and transmits pressure to the valve piston 20. The arrangement is such that the oil pressure will tend to move the valve piston upwardly and the diaphragm prevents any oil from leaking into the governing cylinder. To permit leaking oil to escape below the diaphragm, the chamber or counterbore 24 is drained by an opening 28 through the fitting.

In this example, the piston valve governs the pressure of a gaseous medium, such as air, coming from an outside source 29 through a nipple 30 which is screwed into the housing 17 above a filtering chamber 31 filled with air filtering or cleansing material 32 such as cotton wool or the like. The filtering material may be inserted and replaced through an opening closed by a screw plug 33. From the filtering chamber the air passes through a port 34 into an annular groove 35 around the piston and, thence, through a series of holes 36 into the piston and cylinder. The upper end of the annular groove 35 governs the amount of air which enters the cylinder through port 34. A part of the admitted air is vented to the atmosphere through a vent port 37 near the top of the cylinder 19 and this port is likewise governed by an edge of the piston, being shown as partially closed by the upper edge of the piston. The arrangement is such that, when the inlet port 34 is being opened, the vent port is being closed simultaneously or vice versa. This makes the governor more sensitive.

The governed air pressure is transmitted to the tube 13 leading to the instruments through a port 38 in the cylinder wall and the housing 17 and a screw nipple 39 similar to the nipple 30. This port is never covered by the piston, the upward stroke being limited by an inwardly projecting stem 40 on a screw cap 41 which closes the cylinder. The air pressure in the cylinder is always proportional to the force exerted on the opposite side of the piston, or to the oil pressure in this example. The piston will come to rest and be perfectly counterbalanced as soon as the air pressure multiplied by the area is equal to the force tending to move it upwardly. Any increase in the force will open wide the intake port 34 and simultaneously decrease the opening of the vent port 37 until the increased pressure above the piston restores the equilibrium.

To enable the piston 20 to operate without any tendency to stick, which would affect the accuracy of the indications, provision is made to create a uniform air cushion or film around the piston. In this instance, the air under the supply pressure enters a port 42 through the cylinder wall above the port 34 and passes into an annular groove 43, the width of which is sufficient to register with the port in any position of the piston. Since this air pressure is always greater than the pressure in the cylinder, the air will escape both upwardly and downwardly in the form of a uniform thin film around the piston. The chamber below the piston is vented to the atmosphere through an opening 44 (Fig. 1). Hence, a little of the air in the intake groove 35 can escape in a similar thin film around the bottom portion of the piston. Therefore, the piston is free to float on the air films practically without friction.

In Fig. 1, there is shown a sheet metal cover or shield 45 on the fitting held in place by clamping nuts 46 on the nipples. This casing prevents any dust from entering the governor or clogging the exposed ports.

From the foregoing description, the operation will be clear. However, it will be understood that the improved governor can be used in measuring systems for determining temperature, speed, rate of flow and the like, it being only necessary to obtain a force, by well known means, which can be balanced by the governing device. Moreover, it is obvious that the idea of creating a uniform film of pressure fluid about a piston to eliminate friction, as explained, may be employed in various types of piston valve governing and controlling apparatus.

Obviously, the present invention is not restricted to the particular embodiment thereof herein shown and described. Moreover, it is not indispensable that all the features be used conjointly, since they may be employed advantageously in various combinations and sub-combinations.

What is claimed is:

1. In a force measuring system, a fluid pressure governor comprising a cylinder having inlet and outlet ports and a highly polished inner surface; a hollow piston in the cylinder having a highly polished outer surface and controlling the inlet and outlet ports simultaneously; means to produce a uniform fluid film surrounding the piston; means connected to transmit the force to be measured to the piston; and a source of fluid under pressure connected to the inlet port, the arrangement being such that the piston maintains a pressure in the cylinder which is proportional to the magnitude of the force to be measured.

2. In a force measuring system, a fluid pressure governor having a ported cylinder made of Monel metal with a highly polished inner surface; a piston valve in the cylinder also made of Monel metal and having a highly polished outer surface and a source of gaseous medium under pressure communicating with the cylinder around the piston to create a film between the piston and the cylinder and serving to reduce friction.

3. In a governing device of the character described, a cylinder; a governing piston in the cylinder having an annular groove intermediate its ends; and a source of gaseous medium under pressure communicating with said annular groove for all positions of the piston, said pressure being sufficient to cause the gaseous medium to flow from the groove toward both ends of the piston and thereby produce a uniform film to minimize friction and also prevent the piston from being pressed laterally against one side of the cylinder wall.

4. In a governing device of the class described, a cylinder; a hollow governing piston in the cylinder; a fluid inlet port intermediate the ends of the cylinder; a source of pressure fluid communicating with said inlet port; said piston having an annular inlet groove with one edge controlling the inlet port; said annular groove communicating with the inside of the piston and cylinder; a vent port in the cylinder; said piston having a second annular groove between the first annular groove and the outer end of the piston; and a port in the cylinder connecting the said second annular groove with the source of pressure fluid to produce a uniform fluid film all around the piston and thereby minimize friction.

5. In a governing device of the class decribed, a cylinder; a hollow governing piston in the cylinder; a fluid inlet port intermediate the ends of the cylinder; a source of pressure fluid communicating with said inlet port; said piston having an annular inlet groove with one edge controlling the inlet port; said annular groove communicating with the inside of the piston and cylinder; and a vent port in the cylinder adjacent to and controlled by the outer end of the piston simultaneously with the inlet port whereby the vent port opens and closes as the inlet port closes and opens respectively to make the device very sensitive to changes.

6. In a governing device of the class described, a cylinder; a hollow governing piston in the cylinder; a fluid inlet port intermediate the ends of the cylinder; a source of pressure fluid communicating with said inlet port; said piston having an annular inlet groove communicating at all times with the inlet port; said annular groove communicating with the inside of the piston and cylinder; and a vent port in the cylinder controlled by the outer end of the piston.

7. In a pneumatic force measuring system of the class described, an air pressure governor having a screw fitting adapted to be connected to a fluid chamber or conduit within which the pressure is to be measured; pressure responsive means carried by the fitting; a longitudinally adjustable housing secured to the fitting and having an air filtering chamber; a ported cylinder secured within the housing opposite said pressure responsive means; a hollow governing piston in the cylinder contacting with said pressure responsive means, said cylinder being vented at the inner end beyond the piston; a closure member for the outer end of the cylinder having stop means to limit the outward stroke of the piston; a source of air under pressure communicating with said air filtering chamber and with the cylinder to counteract the force to be measured; and an outlet from the outer end of the cylinder adapted to communicate with pressure responsive instruments.

8. In a pneumatic force measuring system of the class described, an air pressure governor having a screw fitting adapted to be connected to a fluid chamber or conduit within which the pressure is to be measured; a diaphragm within the fittings; a small piston extending through the fitting and acting against the diaphragm; a longitudinally adjustable housing secured to the fitting and having an air filtering chamber; a ported cylinder secured within the housing opposite said diaphragm; a hollow governing piston in the cylinder contacting with said diaphragm, said cylinder being vented at the inner end beyond the piston; a source of air under pressure communicating with said air filtering chamber and with the cylinder to counteract the force to be measured; an outlet from the outer end of the cylinder adapted to communicate with pressure responsive instruments; and a protecting casing for the housing secured to said fitting.

WALDEMAR MÖLLER.